M. C. BUFFINGTON.
Hollow Augers.
No. 149,985. Patented April 21, 1874.
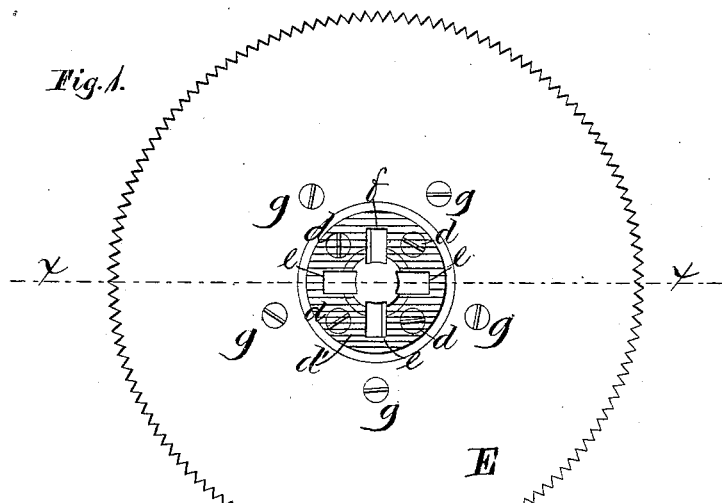
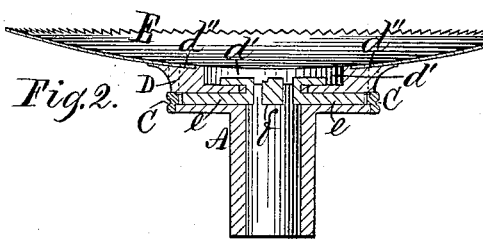
Witnesses.
M. H. Barringer.
Platt R. Richards.
Inventor.
Moses C. Buffington,
by W. B. Richards,
Atty.

UNITED STATES PATENT OFFICE.

MOSES C. BUFFINGTON, OF BURLINGTON, IOWA, ASSIGNOR OF ONE-HALF HIS RIGHT TO JAMES M. FORNEY, OF SAME PLACE.

IMPROVEMENT IN HOLLOW AUGERS.

Specification forming part of Letters Patent No. 149,985, dated April 21, 1874; application filed February 9, 1874.

*To all whom it may concern:*

Be it known that I, MOSES C. BUFFINGTON, of Burlington, county of Des Moines and State of Iowa, have invented certain Improvements in Hollow Augers for cutting round tenons and sawing off the ends of the spokes; and I do hereby declare the following to be a full, clear, and exact description of the same, reference being had to the accompanying drawing forming part of this specification, in which—

Figure 1 is an end elevation of a machine embodying my invention. Fig. 2 is a sectional view of Fig. 1 on the line $x\ x$; and Fig. 3 is a detail view.

The nature of my invention relates to the arrangement of a concavo-convex-shaped saw, with the hollow auger or tool for cutting round tenons, for which Letters Patent of the United States were issued to L. A. Dole the 10th day of January, 1860; and the invention consists in substituting for what is styled in said patent as face-plate D a plate instead thereof, which performs its functions, and, in addition thereto, is so constructed as to facilitate attaching thereto a meniscus-shaped saw, for the purpose of cutting uniformly the ends from the spokes as they are brought into position consecutively for the action of the tenon-borer, all as hereinafter fully described.

Referring to the drawings by letters, letter A represents the flanged cylinder; letters $e\ e\ e$, the radial rests; letter $f$, the cutter; and letter C, the adjusting ring, or ring with spiral-shaped recesses in its inner circumference, for adjusting the radial position of the rests $e$ and cutters $f$. These parts, arranged relatively to each other for co-operation, are substantially the same as shown in the said patent to L. A. Dole. D represents the face-plate, constructed, as shown in the drawings, to retain the radial rests $e$, and cutters $f$, and adjusting-ring C in position, when bolted or screwed to the flange on the cylinder A by screws $d\ d\ d\ d$, substantially in the same manner as in aforesaid patent, but made somewhat thicker than said face-plate in the line of the axis of the cylinder A, so that it may contain a cylindrical cavity, $d'$, the circumferential sides of which extend out far enough to form a protection for the rests $e$ and cutters $f$, as shown plainly at Fig. 2; and also to have an annular rabbet, $d''$, cut into its outer edge and face, to form a seat for the inner circumference of the saw E, the center of which is cut away, as shown in the drawings, and which is bolted or secured to the plate D by any desired number of screws, $g\ g\ g\ g\ g$.

It is desirable with this class of tools for cutting round tenons to have a dished circular saw therewith, in such manner that the wheel of spokes to be operated upon, being pivoted centrally at the hub, it may be turned to bring the spokes consecutively, first to the action of the saw for cutting them of uniform lengths, and thence to the auger for cutting the tenons thereon.

It will be evident to any person skilled in the art to which this invention appertains that, by means of the plate D, constructed substantially as described, the saw E may be neatly, cheaply, and securely attached to the cylinder A in working position.

I am aware that a patent was granted to C. W. Corr, April 30, 1867, for a machine for sawing and tenoning spokes; and I do not, therefore, broadly claim to be the inventor of a combined sawing and tenoning machine, but to have invented a valuable improvement in such machines—that is to say:

I claim as my invention—

The plate D, constructed as described, and arranged to operate with the flanged cylinder A, rests $e\ e$, cutter $f$, adjusting-ring C, and saw E, substantially as described, and for the purpose specified.

MOSES C. BUFFINGTON.

Witnesses:
T. J. TRULOCK,
JAMES M. FORNEY.